United States Patent [19]

Worthen

[11] 3,716,920
[45] Feb. 20, 1973

[54] PRECISION SQUARE
[75] Inventor: John H. Worthen, Providence, R.I.
[73] Assignee: Federal Products Corporation, Providence, R.I.
[22] Filed: Sept. 9, 1969
[21] Appl. No.: 856,324

[52] U.S. Cl. ............... 33/174 M, 33/112, 33/370, 33/384, 33/DIG. 1
[51] Int. Cl. ............................................. B43l 7/00
[58] Field of Search ........ 33/174 M, 112, 96, DIG. 1, 33/207, 88, 89; 248/206 A; 211/87

[56] References Cited

UNITED STATES PATENTS

| | | | |
|---|---|---|---|
| 686,240 | 11/1901 | Whitehill | 33/112 |
| 721,694 | 3/1903 | Green | 33/207 |
| 1,145,922 | 7/1915 | Rigaumont | 33/112 |
| 1,148,196 | 7/1915 | Simmons | 33/112 X |
| 1,355,808 | 10/1920 | Bryant | 33/112 |
| 1,787,807 | 1/1931 | White | 33/207 |
| 2,553,668 | 5/1951 | Morello | 33/DIG. 1 |
| 3,380,165 | 4/1968 | Urban | 33/174 M |

FOREIGN PATENTS OR APPLICATIONS

| | | | |
|---|---|---|---|
| 39,881 | 8/1957 | Poland | 33/174 M |

Primary Examiner—William D. Martin, Jr.
Attorney—Brumbaugh, Graves, Donohue & Raymond

[57] ABSTRACT

A highly accurate precision square can be hung so as to engage a nominally vertical surface and provide a substantially horizontal measuring surface. The measuring surface may be used to support a measuring instrument adapted to determine deviation from the vertical direction as defined by gravity. The device may also be used to determine the straightness of a surface or the angle between a vertical surface and a horizontal surface. Additionally, the square may be used to determine the perpendicularity of two nominally perpendicular surfaces or the parallellism of two nominally vertical surfaces. The square may be hung against a vertical surface in two orientations displaced from each other by 180°. This feature enables two measurements to be made which can be combined to calibrate the angle of the square so that any deviation from 90° it contains can be compensated for in making subsequent measurements.

32 Claims, 11 Drawing Figures

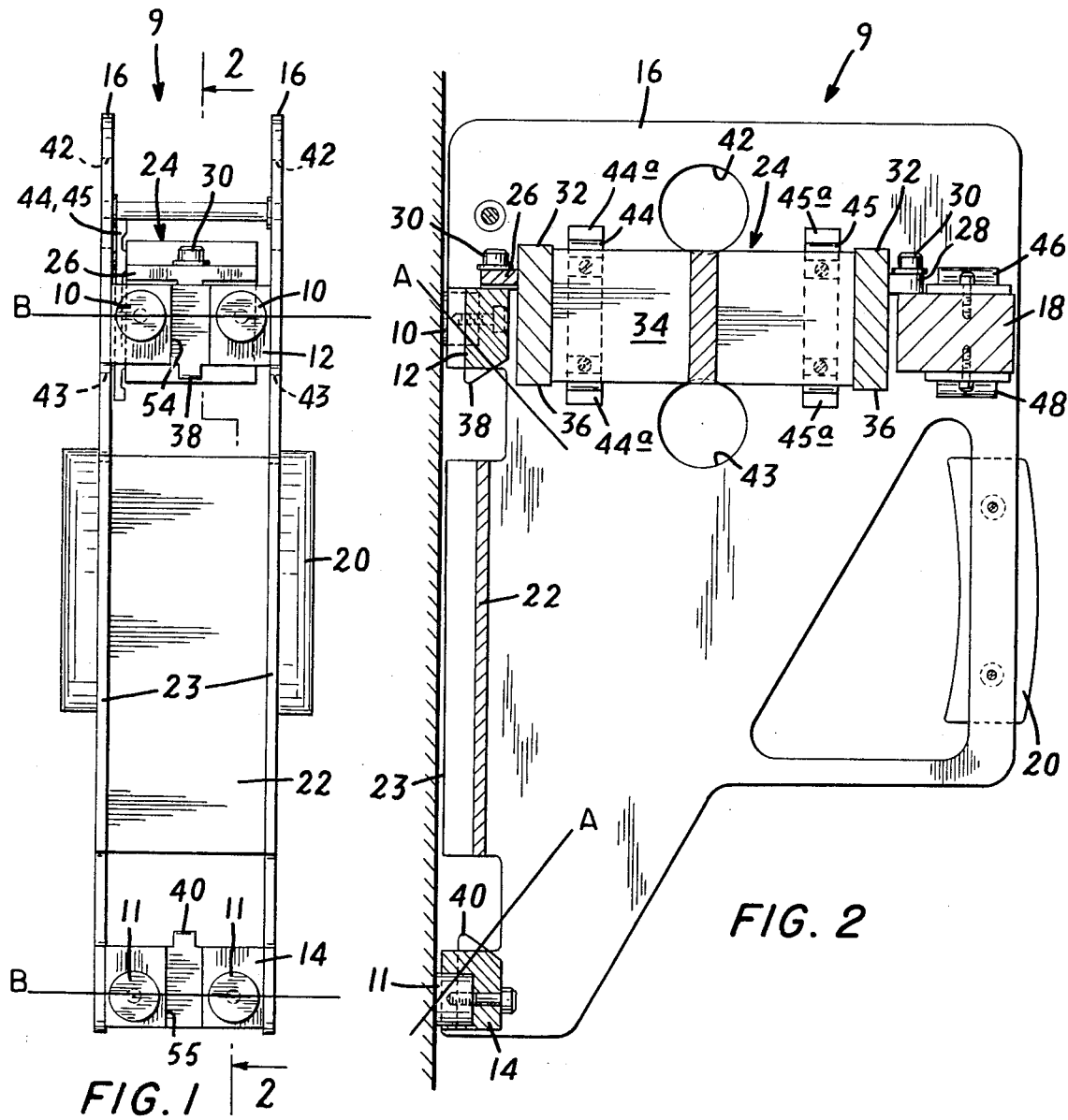
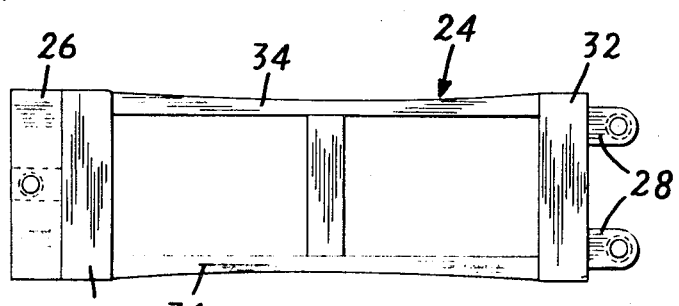

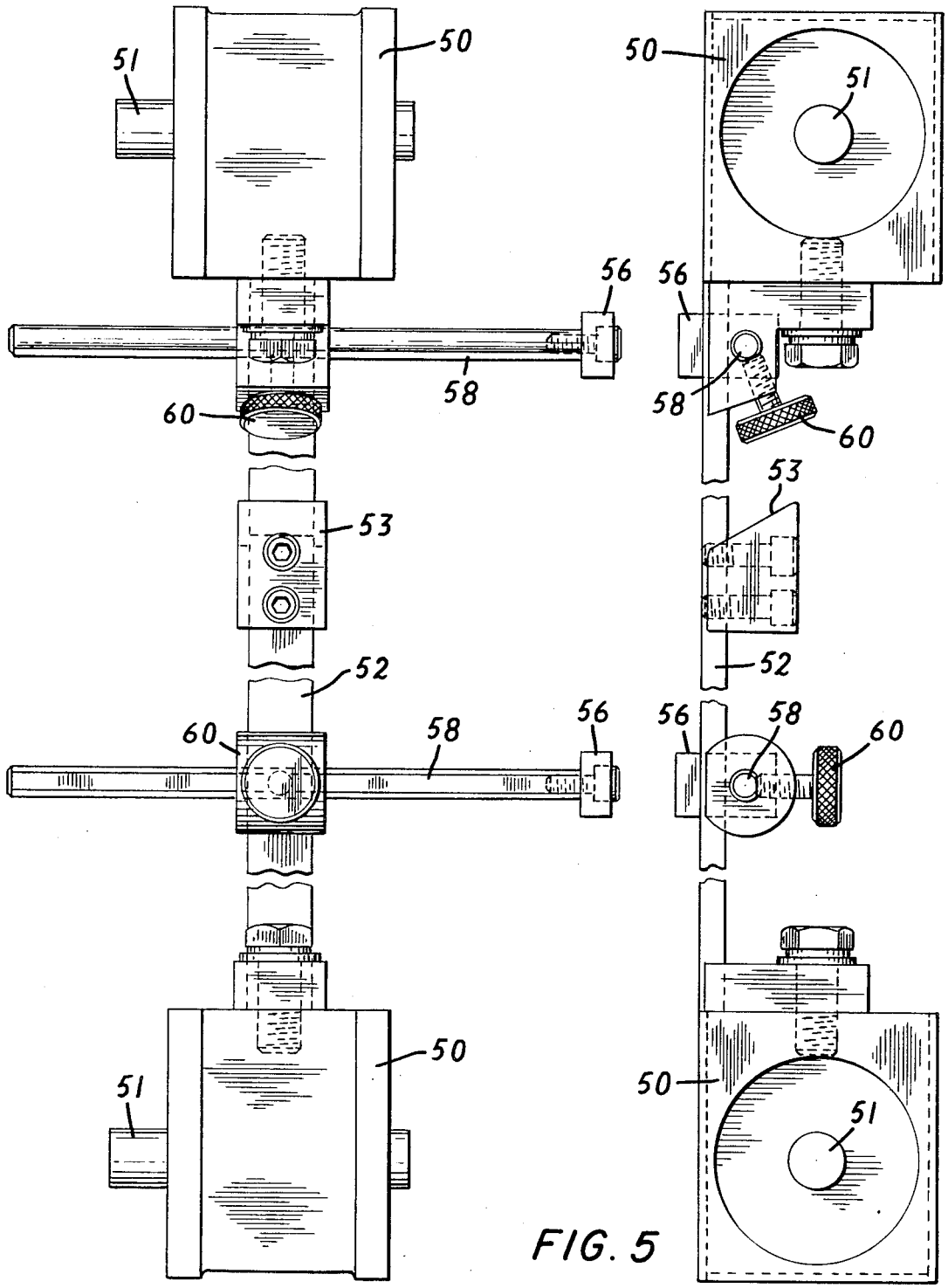

INVENTOR.
JOHN H. WORTHEN
BY Brumbaugh, Graves,
Donohue + Raymond
his ATTORNEYS

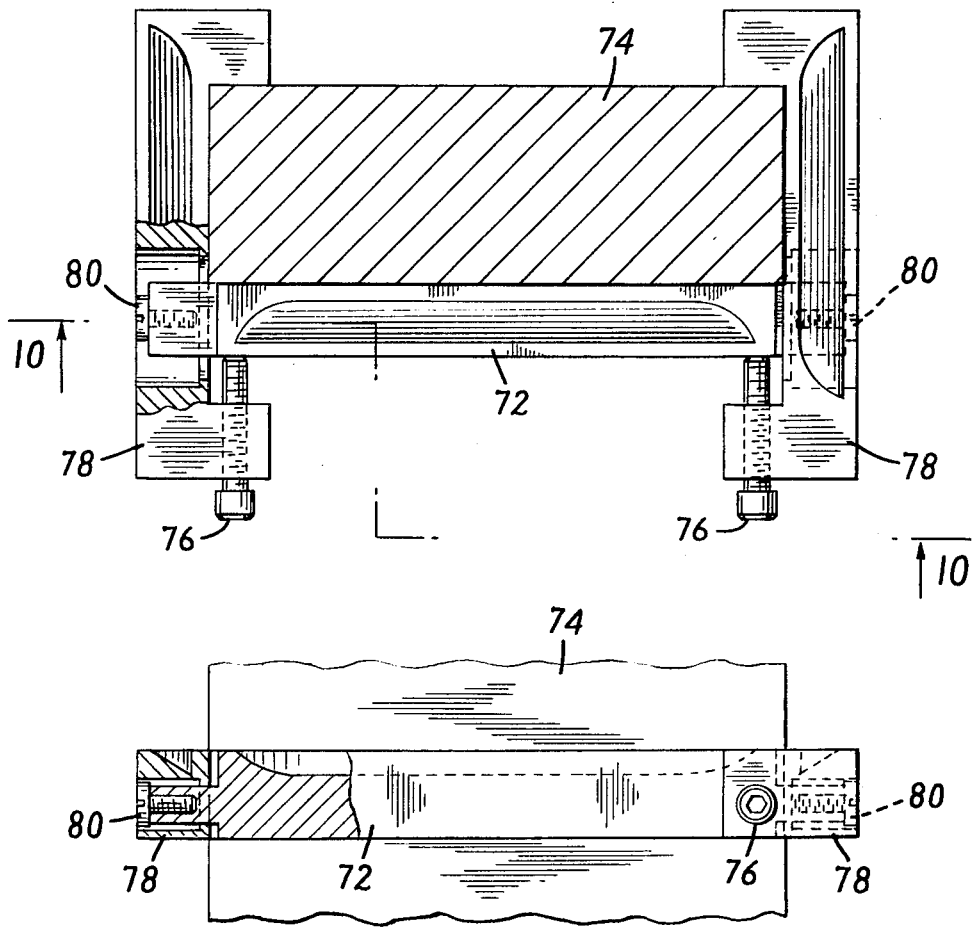
FIG. 9
FIG. 10
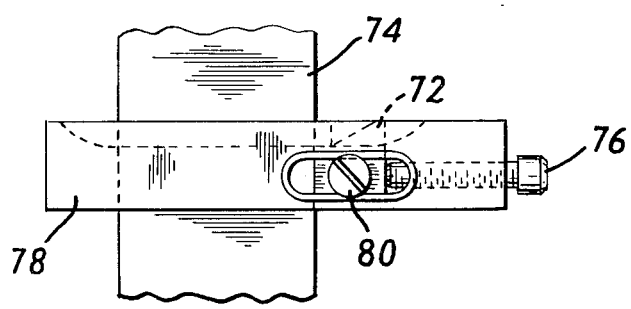
FIG. 11

The square may be used to determine the straightness of a vertical surface by hanging the square against the surface, placing a measuring instrument on the measuring surface, and making a measurement of verticality. Similar measurements are then made at successive linear positions along the nominally vertical surface. In this way, a graph indicating the straightness of the surface may be developed.

In addition, the square may be used to determine the angle between a nominally vertical surface and a nominally horizontal surface. The square is first hung against the nominally vertical surface in the manner described above and one or more readings are taken. The measuring instrument used in making the readings is then placed directly on the nominally horizontal surface, and additional readings are taken. The angle between the two surfaces can be calculated from the difference between the two readings.

In addition, the parallelism of a plurality of nominally vertical surfaces can be determined by applying the square successively to the surfaces as described above and noting the difference in the verticality of the surfaces.

It is also possible to use the square to determine the angle between two nominally perpendicular vertical surfaces. In this instance, the square is held against one of the vertical surfaces with a measuring surface nominally parallel to the second vertical surface. Using a straight edge as a spacer, the distance from the measuring surface to the second vertical surface at two points may be compared and the angle may be computed from these measurements.

Utilizing the apparatus and method described here it is possible to make measurements which are accurate within 0.25 seconds.

BRIEF DESCRIPTION OF THE DRAWING

For a more complete understanding of the invention, reference may be had to the following detailed description taken in conjunction with the accompanying figures of the drawing, in which:

FIG. 1 is a front elevation of an exemplary embodiment of a precision square constructed in accordance with the invention;

FIG. 2 is a sectional view, taken along line 2—2 of the square of FIG. 1, shown in engagement with a nominally vertical surface;

FIG. 3 is a top elevation of an element of the precision square of FIG. 1;

FIGS. 4 and 5 are front and side elevations, respectively, of a hanger for use with the square of FIG. 1;

FIGS. 9, 10, and 11 are top, front, and side elevations, respectively, of a third hanger for use with the square shown in FIG. 1.

DESCRIPTION OF THE PREFERRED EMBODIMENT

Figure 6:
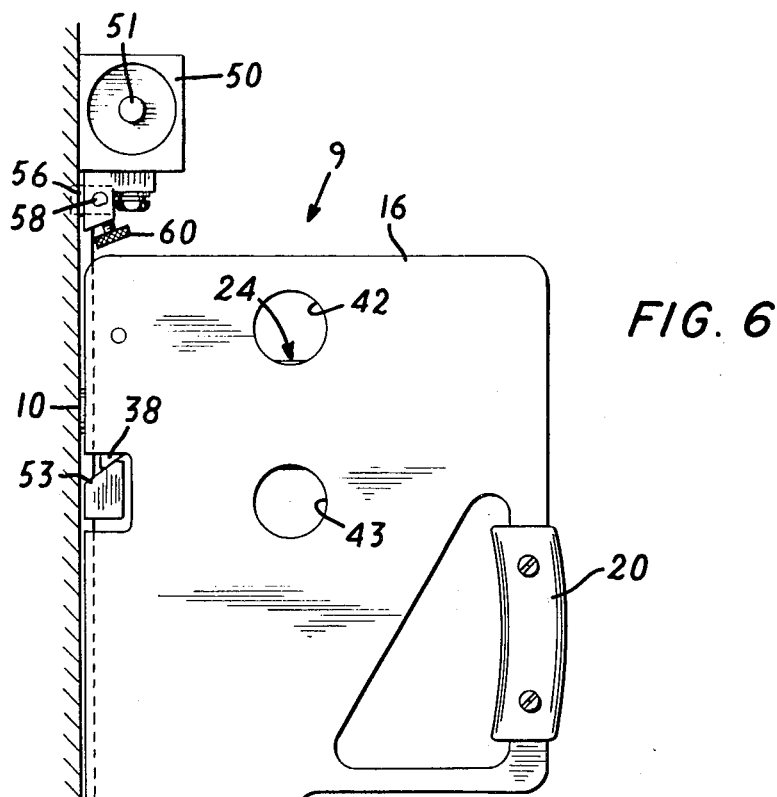
FIG. 6 is a side elevation of the hanger of FIGS. 4 and 5 and the square of FIG. 1, shown in engagement with a nominally vertical surface.

In the embodiment of the invention shown in FIGS. 1 and 2, a square 9 includes a surface-engaging means which comprises a first set of two buttons 10 which are symmetrical with respect to a second set of two buttons 11. The buttons 10 and 11 are accurately held and positioned by connecting blocks 12 and 14, respectively. The connecting blocks are welded to and held between two parallel plate-like side members 16. The side members 16 are also welded to a third connecting block 18. The connecting blocks 12, 14, and 18 are arranged so as to be non-colinear.

A pair of handles 20 are fastened to the side members 16 at convenient locations spaced from the surface-engaging means 10 and 11. A stiffening member 22 is welded to the side members 16 and is positioned between them. The stiffening member 22 is parallel to the longest edge 23 of the side members 16, which lies adjacent the buttons 10 and 11. A measuring block 24 is positioned between the side members 16 where it is supported by a projecting ear 26 at one end and two projecting ears 28 at its opposite end. Each of the ears 26 and 28 is attached to one of the connecting blocks 12 or 18 by a bolt 30.

A top elevation of block 24 is shown in FIG. 3, in which its measuring surfaces 32 can be seen. The portions of the measuring block 24 forming these measuring surfaces are connected by integrally formed struts 34. The ears 26 and 28 are also integrally formed with the block 24.

As shown in FIG. 2, the measuring block 24 has a second set of measuring surfaces 36 which are disposed along the side of the block opposite the side on which measuring surfaces 32 are disposed. Each of the measuring surfaces 32 and 36 are ground and lapped so as to be parallel within a tolerance of 0.2 seconds. It is noted that the block 24 is shaped so that all other surfaces are recessed away from the measuring surfaces 32 and 36. This enables these surfaces to be conveniently worked upon to obtain the close tolerances desired.

When making the device, the measuring surfaces 32 and 36 of the measuring block 24 are first ground and lapped to obtain an approximation of their relative positions. Similarly, the bottom surfaces of the ears 26 and 28 are first ground so that the measuring surfaces 32 and 34 will lie in planes approximately perpendicular to the plane defined by the surfaces of the buttons 10 and 11. The surfaces of the connecting blocks 12 and 18 against which the ears 26 and 28 abut are also ground to obtain this approximation of perpendicularity. The square is then assembled and tested and these surfaces are selectively re-ground by hand until the angle is brought within the desired tolerances.

It is both desirable and possible to make the measuring surfaces 32 and 36 parallel within a tolerance of 0.2 seconds. The error introduced in the measurement is equal to one-half of the angle between these two surfaces. It is preferable, although not essential to the accuracy of the device, that the angle between the planes defined by the measuring surfaces 32 and 36, and the plane defined by the buttons 10 and 11, be within 1 second of 90° because this simplifies the calculations which must be made when the device is used.

The four buttons 10 and 11 are ground and lapped so that they present flat surfaces surrounded by sharp circular edges. If any three of these four buttons are taken to define a plane, the fourth button preferably does not fall outside of the plane defined by the other three by a distance of more than 0.00001 inch.

PRECISION SQUARE

BACKGROUND OF THE INVENTION

The present invention relates to a precision square, and more particularly to a novel and highly effective precision square for use in environments requiring extremely small tolerances, such as the measuring of the ways of vertical turret lathes, vertical boring mills, and similar machine tools.

It is a generally accepted principle in the gaging art that a gage should, if possible, have an accuracy of 10 times that of the article the gage is used to measure. It has been found however that, when measuring angles relating to highly accurate surfaces, it is often not possible to obtain this accuracy utilizing known devices. For example, it is sometimes desired to measure the angle of the vertical ways of machine tools which must be accurate within a tolerance of 4 seconds. In this case, it is necessary to have a precision square which can be held against the vertical surface of the way to provide a horizontal measuring surface to support an electromagnetic transducer, a spirit level, or other measuring instrument capable of determining deviation from the vertical direction as defined by gravity. Utilizing such a device a measuring instrument which requires a horizontal support can be used to determine the verticality of a surface. If the gage is to be accurate within 0.4 seconds (10 times the desired accuracy of the way), a precision square having this degree of accuracy must be provided. A square, the accuracy of which is of this general order of magnitude, is considered a precision square.

It should be borne in mind that a high quality carpenter's square of conventional design is unlikely to be accurate within a tolerance of 4 minutes or less. Obviously, a device of much more sophisticated design is required if the desired accuracy is even to be approached. Accordingly, a conventional carpenter's square can not be considered a precision square.

One of the best previously known solutions to the problem at hand comprises a granite block, several feet high, weighing several hundred pounds, and having two highly accurate surfaces forming an angle of substantially 90°. Under the most favorable conditions, the most accurate measurements made in this way contain a possible error of several seconds or more. This is attributable, in part, to the difficulty of positioning such a heavy, cumbersome object which must be lifted by a crane. The use of a granite block is extremely time-consuming and great care must be taken to prevent the block from damaging the surface against which it is held. Other problems arise because it is necessary for the relatively large surface presented by the block to be held against the way. The larger a surface is, the more difficult it is to finish it within small tolerances and the more difficult it becomes to cause it to engage another surface without particles of dirt interfering.

SUMMARY OF THE INVENTION

The present invention provides a precision square which overcomes many disadvantages of the prior art devices and greatly increases the accuracy obtainable. In addition, it is highly rigid, light and portable.

It comprises one or more measuring surfaces in fixedly disposed relation to a surface-engaging means which accurately defines a plane substantially perpendicular to the measuring surfaces. The surface-engaging means is adapted to accurately engage a nominally vertical surface at a plurality of spaced-apart locations.

The measuring surfaces may be adapted to receive and support a conventional measuring instrument which determines deviation from the vertical direction as defined by gravity. This instrument may comprise, for example, an electronic level or a spirit level.

Suspending means may be provided on the square for accurately hanging it in a position in which the surface-engaging means engages the nominally vertical surface. There may be first and second suspending means adapted to hold the square in first and second orientations, respectively. The second orientation is displaced from the first by 180°.

The surface-engaging means may comprise a plurality of spaced-apart buttons. These buttons may present ground and lapped flat surfaces which engage the nominally vertical surface and may have sharp edges surrounding the flat surfaces.

The plurality of the buttons may be symmetrically arranged so that the same points on the nominally vertical surface are engaged by buttons regardless which of the two orientations the device occupies.

The deviation from 90° which is inherent in the construction of the square may be calculated to determine a calibration factor which can be applied when subsequent measurements are made with the square. Although it is desirable to minimize the correction factor so that it can be ignored when making less accurate measurements, the important characteristic of the square when making highly accurate measurements is that it precisely determines a known angle of approximately 90°.

The calibration factor of the square can be determined by holding the square in a first orientation and using a measuring instrument placed on its measuring surface to make a first measurement of verticality. The square is then hung in a second orientation, in which it is displaced from its first orientation by 180°. The measuring instrument is placed on a second measuring surface and a second measurement of verticality is made. The difference between the two measurements, divided by two, accurately indicates the calibration factor of the square.

The steps of the method described above may be used to accurately determine the verticality of a surface without first calibrating the square. In this case, the two measurements of verticality are averaged and any error contributed by the square while hung in its first position is compensated for by a corresponding and opposite error which occurs when the square is hung in its second orientation.

When the square is used to determine verticality or calibrated in the manner described above, or when other methods described herein are carried out, it is preferable to take two readings with the measuring instrument while the square is hung in a single orientation. The position of the measuring instrument on the measuring surface of the square is reversed between the taking of these two readings. The angles determined by the readings are averaged to obtain a single measurement of verticality. This compensates for any error introduced by inaccuracies in the measuring instrument.

Two suspending means, comprising inclined ramps 38 and 40, are integrally formed with the connecting blocks 12 and 14, respectively. These ramps 38 and 40 are each arranged so that a line A may be taken, perpendicular to the ramp and near its center, which passes through a line B connecting the centers of the two nearest buttons 10 or 11. Because of this arrangement, the weight of the square exerts forces which pass directly through the buttons 10 and 11. This minimizes stresses within the square which could slightly bend or distort it causing a decrease in its accuracy. In the event that only a portion of the ramp is engaged by a hanger from which the square is hung, the line A should be taken through the center of the area of the ramp A engaged by the hanger.

Two holes 42 and 43 are provided in each of the side members 16. The holes are convenient when positioning and inspecting a measuring instrument supported by the measuring surfaces 32 and 36. A pair of side locators 44 and 45, which are positioned near the measuring surfaces 32 and 36, respectively, locate the measuring instrument perpendicular to the surface engaged by the buttons 10 and 11, the measuring instrument being conveniently pushed against the side locator. The plane defined by the instrument-engaging surfaces 44a and 45a of the locators 44 and 45 is preferably perpendicular to the plane defined by the buttons 10 and 11 within an angle of one minute.

Two spherical bubble levels 46 and 48 are attached to opposite sides of the connecting block 18. These levels provide a means of vertically orienting the square within the plane of the nominally vertical surface so that the buttons 10 are positioned directly above the buttons 11 or conversely. They may also be used to approximately adjust the verticality of the surface so that the more accurate instrument supported by the measuring surfaces will be within the range of its measuring scale.

A protective cover on the outer surfaces of the side members 16 is preferably omitted, because the attachment of such a cover, which might have a coefficient of thermal expansion different from that of the side members 16, could introduce inaccuracies into the device. If such a protective cover is utilized, it should be loosely connected to the device so as to avoid this disadvantageous effect.

Preferably, the side members 16, the connecting blocks 12, 14, 18, and the stiffening member 22 are made of stainless steel. The buttons 10 and 11 and the measuring block 24 are preferably made of hardened steel. The stainless steel members are welded together, thereby avoiding the use of joints which could work loose. The weldment is stress relieved to preserve its dimensional stability. The hardened steel members are attached by bolts, rather than being welded. If they were welded it would be necessary for them to be stress relieved, which would soften them, making it difficult or impossible to maintain the accuracy of their surfaces.

The handles are preferably made of wood or plastic because these materials have relatively low coefficients of thermal conductivity and, thus, prevent heat from the hand of the user from being conducted to the square causing a portion of it to expand and distort.

In this exemplary embodiment of the invention, the buttons 10 may be spaced from the buttons 11 by a distance of 10.30 inches and the two buttons 10 may be spaced from each other by a distance of 1.50 inches as are the two buttons 11. These dimensions have been found advantageous in many typical environments in which a precision square might be used. If the square is made substantially larger, it may be desirable to add a second stiffening member in addition to stiffening member 22.

A hanger from which the precision square described above may be hung is shown in FIGS. 4, 5, and 6. The hanger is shown in conjunction with the square 9 and in engagement with a nominally vertical surface 49 in FIG. 6. In the construction of this hanger, two conventional magnetic retaining means 50, which can be actuated by control means 51, are connected by a stainless steel bar 52 which supports a ramp 53. The magnetic retaining means 50 hold the bracket against a nominally vertical surface 49 and the precision square may be hung from the bracket so that either of the two ramps 38 and 40 engages the ramp 53 and the four buttons 10 engage the nominally vertical surface 49. It is desirable to provide two recessed portions 54 and 55 between the two buttons supported by each of the connecting blocks 12 and 14, respectively. The recessed portions 54 and 55 allow a space for the bar 52 when the square is hung against a surface, as shown in FIG. 6.

The hanger is provided with two guide means 56 which are attached to the ends of rods 58. Set screws 60 allow the distance between the bar 52 and the guide means 56 to be adjusted. Accordingly, when the hanger is placed against a vertical surface (as shown in FIG. 6) with the bar 52 parallel to a straight edge of the surface 49, the guide means 56 can be adjusted to engage the edge of the surface 49. The hanger can then be moved to successive locations along the nominally vertical surface 49 while using the guide means 56 to maintain a constant distance between the ramp 53, from which the square is hung, and the edge of the surface 49.

Figure 7:
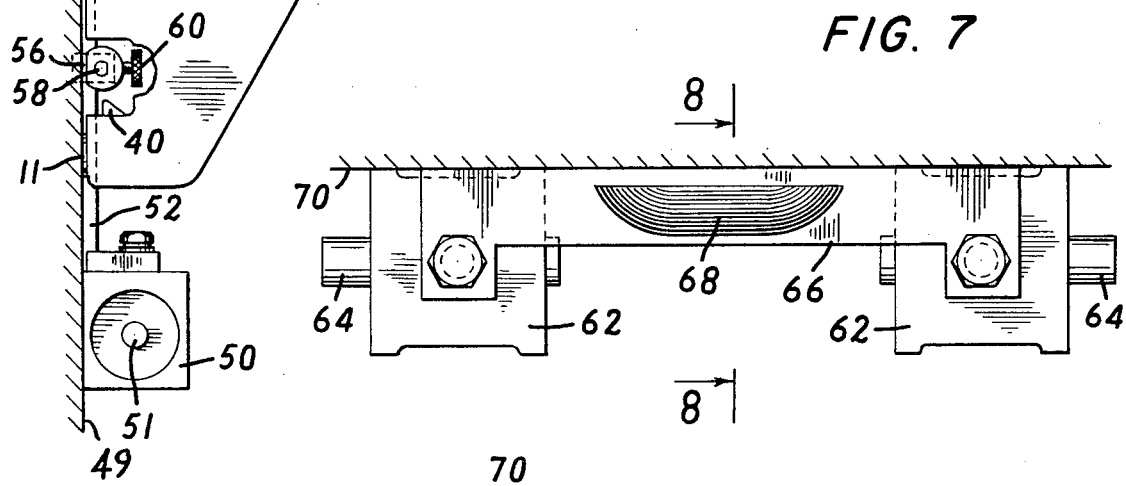
FIGS. 7 and 8 are top and side elevations, respectively, of a second hanger for use with the square shown in FIG. 1.
Figure 8:
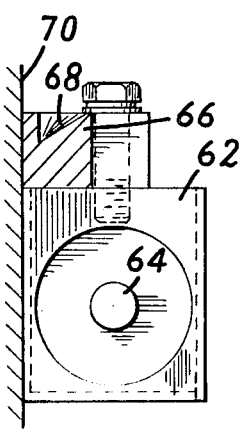

FIGS. 7 and 8 show a second type of hanger for use with a precision square. It comprises two conventional magnetic retaining means 62, which may be actuated by control means 64. A stainless steel bar 66, which connects the two magnetic retaining means 62, is provided with a recessed portion 68, which is adapted to engage either of the ramps 38 and 40 of the square. Accordingly, the magnetic retaining means 62 may be placed against a nominally vertical surface 70 and the retaining means 62 may then be actuated by the control means 64, thereby securing the hanger to the nominally vertical surface 70. The square may be hung from the bracket so that one of the ramps 38 and 40 engages the recessed portion 68 of the hanger and the buttons 10 and 11 engage the nominally vertical surface 70.

A third hanger, suitable for use with a precision square, is shown in FIGS. 9, 10, and 11. This type of hanger is particularly suitable for use when measuring machine ways. A bar 72, which may be engaged by a ramp 38 or 40 of the square, is held against a machine way 74 by the force exerted on it by two set screws 76. The two set screws 76 are supported and engaged by two C-shaped clamping members 78. When the device is not in use, the bar 72 is loosely held between the two clamping members 78 by the screws 80.

Various methods employing a precision square to make highly accurate measurements will now be described. These methods will be explained with reference to the apparatus described above. The importance of many sophisticated features of the apparatus will be apparent from this explanation.

The simplest method to be described involves a determination of the verticality of a nominally vertical surface. First, a hanger is attached to the surface. The precision square is then hung by one of the ramps 38 and 40 so that the buttons 10 and 11 engage the surface at a plurality of locations. A measuring instrument for determining deviation from the vertical direction as defined by gravity is then placed upon one of the horizontal measuring surfaces 32 and 36 (32 in the event that the ramp 38 is used, and 36 in the event that the ramp 40 is used). In the description of this and other methods the surfaces 32 which define a plane are considered to be one measuring surface. Similarly, the surfaces 36 may be considered to be one measuring surface.

After hanging the square, a measurement of verticality is made. This measurement comprises at least one and preferably two readings taken with the measuring instrument. If two readings are taken, the position of the measuring instrument on the measuring surface should be reversed before the second reading is taken. The angles determined by the two readings are then averaged to arrive at the measurement of verticality thereby compensating for errors inherent in the measuring instrument. If required by the accuracy desired, a calibration factor may be applied to the measurement to compensate for any deviation from 90° inherent in the construction of the square.

As stated above, it is preferable that the angle of the square, defined as the angle between either of the measuring surfaces 32 or 36, and the plane defined by the buttons 10 and 11, be within one second of 90°. This makes it unnecessary to apply a calibration factor if errors of one second are acceptable.

A method of determining the calibration factor of the square will now be explained. The square is hung in a first orientation and a measurement of verticality comprising one or more readings is taken using a measuring instrument. The square is then hung in a second orientation displaced from the first orientation by 180° and a second measurement of verticality is similarly made. In order words, if the first measurement is made using ramp 38 and measuring surface 32 (this corresponding to the first orientation), the second measurement is made using ramp 40 and measuring surface 36 (this corresponding to the second orientation). The difference between the two measurements of verticality divided by two reflects the error inherent in the construction of the square and is called a calibration factor.

Because the calibration factor of the square can be determined using the technique described above, the square is said to be "self-checking." This self-checking feature may be used to provide periodic surveillance of the angle of the precision square.

If only one determination of verticality is to be made and a high degree of accuracy is desired, the verticality of the surface may be computed directly from the readings of the instrument obtained in the manner described above without computing the calibration factor of the square. To accomplish this, the angles computed in accordance with each of the two measurements of verticality are averaged. Errors attributable to the construction of the square which are included in the first measurement will be eliminated by compensating errors included in the second measurement.

In making the calculations described above, as in making other calculations to be described below, it is assumed, and it is important to remember, that if a deviation from the vertical in one direction is regarded as a positive angle, then deviation from the vertical in the opposite direction must be regarded as a negative angle. This difference in the signs of the angles must be accounted for when angles are added.

At this point, the importance of the design of the surface-engaging means comprising the buttons 10 and 11 of the square may easily be appreciated. These buttons are capable of engaging the surface with considerably more accuracy than a single large flat surface. The sharp edges surround the surfaces of the buttons 10 and 11 are useful in preventing small pieces of dirt from becoming trapped between one of the buttons 10 and 11 and the nominally vertical surface. To avoid this, the buttons 10 and 11 are first pressed against the surface and then the square is slidably displaced by at least the diameter of a button, and then returned to its original position. When this is done, the sharp edges of the buttons 10 and 11 push dirt particles out of the way. Accordingly, buttons having flat surfaces and relatively sharp edges are preferred to buttons having rounded surfaces and edges.

It should be appreciated that dirt particles commonly found in environments in which a precision square of the type described above would ordinarily be used might be expected to have a typical diameter of 0.001 inch. If one of the buttons 10 and 11 were placed against such a dirt particle and another button 5 inches away rested directly on a flat surface, the angle between a line connecting the surfaces of the two buttons would form an angle of approximately 40 seconds with the flat surface. This error is greatly in excess of the error of 0.25 second within which the device can be constructed.

An appropriate instrument for use in conjunction with the precision square and which may be conveniently placed upon the measuring surfaces 32 or 36 is a high accuracy angular displacement indicator such as the Federal Products Indicator Model No. 231, which has a read-out of one arc second per division and is sufficiently accurate for reading an angle of 0.25 second. The Federal Products Indicator Model No. 232P–68 is also suitable, having 0.5 second per graduation. The measuring instrument might also be a spirit level, however in this instance the measurements made are only read to within two seconds and the properties of the precision square are, accordingly, not taken advantage of to the fullest extent possible.

When the technique described above in which readings are taken while the square is hung in two successive orientations is used, the arrangement of the buttons is particularly important to the limits of the accuracy of the measurements which may be obtained. The buttons are preferably arranged in a symmetrical pattern in which there are two sets of buttons (one set designated 10 and the other designated 11 in this embodiment). When the square is hung by the ramp 38

3. The precision square of claim 2 wherein said first and second suspending means are arranged so that the same plurality of locations on said nominally vertical surface is engaged when said square occupies its first and second orientations.

4. The precision square of claim 3 in which said surface-engaging means comprises four buttons.

5. The precision square of claim 3 on which at least two parallel measuring surfaces are provided.

6. The precision square of claim 5 in which said surface-engaging means comprises an even number of at least four symmetrically arranged buttons.

7. The precision square of claim 6 in which said buttons have ground and lapped flat surfaces.

8. The precision square of claim 7 in which the flat surfaces of said buttons are surrounded by sharp edges.

9. The precision square of claim 5 in which said two measuring surfaces are disposed on opposite sides of a measuring block.

10. The precision square of claim 9 further comprising two parallel side members connected to each other by at least three non-colinear connecting blocks, said measuring block being positioned between said side members and supported from at least one of said side members.

11. The precision square of claim 10 in which said connecting blocks are welded to said side members.

12. The precision square of claim 11 in which said connecting blocks and said side members are stress relieved.

13. The precision square of claim 12 in which said surface-engaging means comprises four buttons, and said buttons and said measuring block are made of hardened steel which has not been stress relieved.

14. The precision square of claim 13 in which said buttons are attached to at least two of said connecting blocks.

15. The precision square of claim 14 in which said measuring block is attached to at least two of said connecting blocks by bolts.

16. A precision square comprising a measuring block having two parallel measuring surfaces disposed on opposite sides thereof adapted to receive a measuring instrument, surface-engaging means in fixedly disposed relation to said measuring surfaces accurately defining a plane substantially perpendicular to said measuring surfaces, said surface-engaging means comprising four buttons which are adapted to accurately engage a nominally vertical surface at a plurality of spaced-apart locations, first suspending means for hanging said square in a first orientation, second suspending means for hanging said square in a second orientation, said second orientation being displaced from said first orientation by 180°, said first and second suspending means being arranged so that the same plurality of locations on said nominally vertical surface is engaged when said square occupies its first and second orientations, and two parallel side members connected to each other by at least three non-colinear connecting blocks, said measuring block being positioned between said side members and supported by two of said connecting blocks, each of said suspending means comprising means forming a ramp located on a different one of said connecting blocks adapted to be engaged by a hanger for suspending said square in its first and second orientations.

17. The precision square of claim 16 in which each of said ramps is arranged so that a line taken perpendicular to the ramp and near its center passes through a line connecting the centers of the two nearest buttons.

18. The precision square of claim 16 in which each of said ramps is arranged so that a line taken perpendicular to the ramp and near the center of the area of the ramp engaged by a hanger passes through a line connecting the centers of the two nearest buttons.

19. The precision square of claim 16 in which at least one stiffening member is positioned between said side members.

20. The precision square of claim 19 in which a handle is attached to at least one of said side members, said handle being made of a material which has a low coefficient of thermal conduction.

21. A square comprising two parallel plate-like side members, at least three spaced non-colinear connecting blocks located between and attached to said side members, surface-engaging means supported by two of said connecting blocks for accurately engaging a nominally vertical surface, said two connecting blocks which support said surface-engaging means each having provided thereon a suspending means for hanging said square in a position in which said surface-engaging means engages the nominally vertical surface, the orientations of said square in the two positions in which said square is hung by said two suspending means being displaced from each other by 180°, and a measuring block having two measuring surfaces disposed on opposite sides thereof adapted to receive a measuring instrument for determining the deviation from the vertical direction as defined by gravity, said measuring surfaces being parallel to each other and perpendicular to a plane defined by said surface-engaging means, said measuring block being positioned between said side members and supported from at least one of said side members.

22. The square of claim 21 further comprising a means for vertically orienting said square within the plane of the nominally vertical surface so that one of said surface engaging means is positioned directly above the other surface engaging means.

23. The square of claim 22 in which said means for vertically orienting said square within the plane of the nominally vertical surface comprises at least one spherical bubble level.

24. A device for supporting, on a horizontal measuring surface adjacent a nominally vertical surface, a measuring instrument capable of determining deviation from the vertical direction as defined by gravity comprising a hanger adapted to be secured to the nominally vertical surface and a square having two spaced apart suspending means for engaging said hanger so as to hang said square from said hanger in two different orientations displaced from each other by 180°, said square also having a measuring block with two parallel measuring surfaces disposed on opposite sides thereof for supporting said measuring instrument when said square is hung in the two orientations.

25. The device of claim 24 in which said hanger comprises two spaced magnetic retaining means connected by a bar, said bar having a hanging element for engaging said two suspending means.

26. A device for supporting, on a horizontal measuring surface, a measuring instrument capable of deter- (this being its first orientation), the buttons 10 engage the points on the nominally vertical surface which are engaged by the buttons 11 when the device is hung by the ramp 40. Conversely, when the device is hung by the ramp 40 (this being its second orientation) the buttons 11 engage the points which are engaged by the buttons 10 when the device is hung by the ramp 38. This is referred to herein as the repeating feature of the precision square.

Because the repeating feature of the device is important, it is preferred to utilize four buttons. This provides a minimum of redundancy while enabling the same points on the surface to be utilized while the device is hung in successive orientations. It would, of course, be possible to obtain some of the same advantages by utilizing a different even number of buttons. For instance, eight buttons could be used, providing four in each set. In the event that an odd number of buttons is used, it is preferred to sacrifice the repeating feature of the device in order to maintain its symmetry. In other words, if two buttons 10 are employed near the ramp 38, but only one button 11 is employed near the ramp 40, the button 11 should be placed half way between the side members 16 rather than directly beneath either of the two buttons 10. Although placing one button 11 directly beneath one of the two buttons 10 would provide a repeating feature to some extent, the presence of a button 11 on only one side of the device would cause unsymmetrical stresses within the square which would tend to decrease its accuracy.

Another method employed a precision square may be used to determine the straightness of a vertical surface. In this instance the square is hung so that the buttons 10 and 11 engage the vertical surface and a first measurement indicating verticality is made as previously explained. The square is then moved along the surface to a second successive position in which the buttons 10 engage the points on the surface which were previously engaged by the buttons 11. The buttons 11 now engaging new points, a second measurement is made. The square is then moved again so that the buttons 10 engage the second group of points previously engaged by the buttons 11, and a third measurement is then made. This process may be repeated as many times as desired and the differences between the measurements made at each of the successive positions provide an accurate indication of the straightness of the surface. As in the other methods, each measurement may comprise one or more readings taken with the same measuring instrument. If two readings are taken, the measuring instrument should be reversed between the readings. It is desirable, according to this method, to employ a hanger having guide means which will insure that the device is moved along the surface in a straight line. Appropriate guide means 56 are shown in FIGS. 4, 5, and 6.

A method of determining the parallelism of two or more nominally vertical surfaces comprises determining the verticality of each of the surfaces according to any of the methods explained above and computing this parallelism from their respective verticalities.

Another method involving the use of a precision square enables the angle between a nominally vertical surface and a nominally horizontal surface to be accurately determined. The square is first hung against the vertical surface and a measuring instrument which determines deviation from the vertical direction is placed on one of the measuring surfaces (32 or 36) and one or more readings are taken as explained above. The measuring instrument is then placed directly on the nominally horizontal surface and a second reading is taken. The second reading is subtracted from the first, the difference being the deviation from 90° of the angle between the nominally vertical surface and the nominally horizontal surface. Again, two readings between which the instrument is reversed may be used in each case. If the angle of the square differs from 90°, this must be compensated for in the calculations.

An additional method which can be practiced employing a precision square involves the determination of the angle between two nominally perpendicular vertical surfaces. The precision square is first positioned so that the buttons 10 and 11 engage one of the two vertical surfaces while maintaining the plane defined by the measuring surface 32 nominally parallel to and spaced from the second vertical surface. A straight edge comprising a steel bar with two parallel sides is used as a spacer. It is placed against the second surface in a horizontal position and the distance between the straight edge and the plane defined by the measuring surface 32 is measured at two spaced apart locations. An electronic measuring device may be used to make these measurements. It is possible to calculate the angle between the two nominally perpendicular vertical surfaces from this difference between these two measurements. It is preferable that the buttons be provided on the straight edge, along the edge which contacts the second vertical surface, so that this surface may be as accurately engaged as possible.

Although the invention has been described with reference to specific embodiments, modifications and variations will readily occur to those skilled in the art. For example, differently shaped buttons could be used or the connecting blocks could be arranged differently. Therefore, the invention is not to be construed as limited to the specific embodiments described, but all such variations and modifications are included within the intended scope of the invention as defined by the following claims.

I claim:

1. A precision square comprising a measuring surface adapted to receive a measuring instrument, surface-engaging means in fixedly disposed relation to said measuring surface accurately defining a plane substantially perpendicular to said measuring surface, said surface-engaging means being adapted to accurately engage a nominally vertical surface at a plurality of spaced-apart locations, and suspending means for engaging a hanger adjacent the nominally vertical surface so as to hang said square in a position in which said surface-engaging means accurately engages the nominally vertical surface and in which the measuring surface is horizontal.

2. The precision square of claim 1 in which said suspending means comprises first suspending means for hanging said square in a first orientation and second suspending means for hanging said square in a second orientation, said second orientation being displaced from said first orientation by 180°.

mining deviation from the vertical direction as defined by gravity comprising a hanger and a square having suspending means for engaging said hanger so as to hang said square from said hanger in two different orientations displaced from each other by 180°, said square also having a measuring block with two measuring surfaces disposed on opposite sides thereof adapted to support said measuring instrument, said hanger comprising two magnetic retaining means connected by a bar, said hanger further comprising adjustable guide means for engaging the edge of a nominally vertical surface.

27. The precision square of claim 10 in which said measuring block is supported by two of said connecting blocks.

28. The precision square of claim 10 in which each of said suspending means comprises means forming a ramp supported from at least one of said side members.

29. The square of claim 21 in which each of said two suspending means comprises means forming a ramp.

30. The device of claim 25 in which said hanging element comprises means forming a ramp, and each of said suspending means comprises means forming a ramp adapted to engage said hanging element ramp means so as to urge said square against the nominally vertical surface.

31. The device of claim 24 in which said hanger comprises means forming a ramp, and each of said suspending means comprises means forming a ramp adapted to engage said hanger ramp means so as to urge said square against the nominally vertical surface.

32. A precision square comprising a measuring block having two parallel measuring surfaces disposed on opposite sides thereof adapted to receive a measuring instrument, surface-engaging means in fixedly disposed relation to said measuring surfaces accurately defining a plane substantially perpendicular to said measuring surfaces, said surface-engaging means comprising four buttons which are adapted to accurately engage a nominally vertical surface at a plurality of spaced-apart locations, first suspending means for hanging said square in a first orientation, second suspending means for hanging said square in a second orientation, said second orientation being displaced from said first orientation by 180°, said first and second suspending means being arranged so that the same plurality of locations on said nominally vertical surface is engaged when said square occupies its first and second orientations, and two parallel side members connected to each other by at least three non-colinear connecting blocks, said measuring block being positioned between said side members and supported from at least one of said side members, each of said suspending means comprising means forming a ramp supported from at least one of said side members adapted to be engaged by a hanger for suspending said square in its first and second orientations.

* * * * *